(12) United States Patent
Ando et al.

(10) Patent No.: US 11,190,122 B2
(45) Date of Patent: Nov. 30, 2021

(54) MOTOR DRIVING APPARATUS

(71) Applicant: OKUMA Corporation, Aichi (JP)

(72) Inventors: Masayuki Ando, Aichi (JP); Satoshi Eguchi, Aichi (JP)

(73) Assignee: OKUMA CORPORATION, Aichi (JP)

( * ) Notice: Subject to any disclaimer, the term of this patent is extended or adjusted under 35 U.S.C. 154(b) by 0 days.

(21) Appl. No.: 16/445,843

(22) Filed: Jun. 19, 2019

(65) Prior Publication Data

US 2020/0059185 A1 Feb. 20, 2020

(30) Foreign Application Priority Data

Jun. 22, 2018 (JP) .............................. JP2018-118781

(51) Int. Cl.
*H02P 21/00* (2016.01)
*H02P 21/24* (2016.01)
*H02P 6/10* (2006.01)

(52) U.S. Cl.
CPC ................ *H02P 21/50* (2016.02); *H02P 6/10* (2013.01); *H02P 21/24* (2016.02)

(58) Field of Classification Search
CPC ............. H02P 21/50; H02P 21/24; H02P 6/10
USPC ................................................... 318/400.02
See application file for complete search history.

(56) References Cited

U.S. PATENT DOCUMENTS

| | | | | |
|---|---|---|---|---|
| 6,417,982 B1 * | 7/2002 | Ottesen | ................ | G11B 5/5526 360/77.02 |
| 7,253,987 B1 * | 8/2007 | Shim | .................... | G11B 5/5552 360/77.02 |
| 8,508,171 B2 * | 8/2013 | Miyaji | ................. | G05B 19/404 318/560 |
| 8,958,170 B1 * | 2/2015 | Harper | ................ | G11B 15/602 360/77.12 |
| 9,599,969 B2 * | 3/2017 | Miyaji | ................. | G05B 19/404 |
| 10,553,248 B1 * | 2/2020 | Iwashiro | ............ | G11B 5/59605 |

(Continued)

FOREIGN PATENT DOCUMENTS

| | | |
|---|---|---|
| JP | H089671 A | 1/1996 |
| JP | 2000152687 A | 5/2000 |

(Continued)

OTHER PUBLICATIONS

JPO Notification of Reasons for Refusal for corresponding JP Application No. 2018-118781; dated, Aug. 17, 2021.

*Primary Examiner* — Kawing Chan
(74) *Attorney, Agent, or Firm* — Cantor Colburn LLP (57) ABSTRACT

A torque ripple and a position error caused by an offset error of the current sensor affects an electrical angle frequency of a motor. In an apparatus of the present disclosure, a computation device executes a power spectrum computing process when a three-phase alternating current motor is at a constant speed, and a value obtained by subtracting a position command value from a position detected by a position detector is fast Fourier transformed, to compute a power spectrum of a position error signal at the electrical angle frequency. Then, the computation device executes an offset correction computing process, to evaluate the power spectrum and to update an offset correction amount. By repeatedly executing these processes when the three-phase alternating current motor is driven at a constant speed, the torque ripple and position error caused by the offset error are reduced.

2 Claims, 5 Drawing Sheets

(56) References Cited

U.S. PATENT DOCUMENTS

| | | | | |
|---|---|---|---|---|
| 2007/0046677 | A1* | 3/2007 | Hong | G05B 19/41 345/442 |
| 2008/0117992 | A1* | 5/2008 | Murokita | G01D 5/24452 375/250 |
| 2009/0252009 | A1* | 10/2009 | Kubota | G11B 7/0946 369/53.3 |
| 2011/0051581 | A1* | 3/2011 | Janik | G11B 27/36 369/53.42 |
| 2014/0217952 | A1* | 8/2014 | Miyaji | G05B 19/404 318/611 |
| 2015/0137727 | A1* | 5/2015 | Furutani | G05D 3/12 318/566 |
| 2015/0158396 | A1* | 6/2015 | Walters | B60W 50/04 701/22 |
| 2016/0195869 | A1* | 7/2016 | Sagemueller | G05B 19/402 700/195 |
| 2017/0111000 | A1* | 4/2017 | Saito | H02P 27/06 |
| 2018/0262145 | A1 | 9/2018 | Saito et al. | |

FOREIGN PATENT DOCUMENTS

| | | |
|---|---|---|
| JP | 2011061910 A | 3/2011 |
| JP | 5447810 B2 | 3/2014 |
| JP | 6080687 B2 | 2/2017 |
| JP | 2017079514 A | 4/2017 |

* cited by examiner

MOTOR DRIVING APPARATUS

CROSS REFERENCE TO RELATED APPLICATION

The present invention claims priority under 35 U.S.C. § 119 to Japanese Patent Application No. 2018-118781 filed on Jun. 22, 2018, the entire content of which is incorporated herein by reference.

TECHNICAL FIELD

The present disclosure relates to a motor driving apparatus, and in particular to a technique for suppressing a control error of a motor.

BACKGROUND

In the present specification, a technique will be described which reduces a torque ripple caused by an offset error of a current sensor in a driving apparatus of a three-phase alternating current motor exemplified as an embodiment of the present disclosure (a driving apparatus of a three-phase alternating current motor employed primarily in shaft control, in particular, feed shaft control, of an NC machine tool).

For a feed shaft of an NC machine tool, in many cases, a three-phase alternating current motor having a high torque and which can be easily controlled is used. When the three-phase alternating current motor is driven, if a detection value of a current sensor has an offset error, a ripple would be superposed on d-axis and q-axis currents when the three-phase alternating current is converted into a two-phase rotational coordinate system by vector control (in general, a magnetic pole direction is called a d axis, and an electrically orthogonal direction to the d axis is called a q axis). In the three-phase alternating current motor, because torque is generated proportional to the d-axis and q-axis currents, the torque ripple is caused proportional to the ripples of the d-axis and q-axis currents.

As a result, a torque ripple is caused in the three-phase alternating current motor due to the offset error of the d-axis and q-axis currents. In the feed shaft of the NC machine tool, a torque ripple component causes a position error which is an error of a rotational position of a rotor of the motor, which then becomes a cause for degradation of machining precision such as appearance of a streak on a cut surface or the like.

One effective means for suppressing the position error due to the torque ripple is increasing feedback gains for a speed and a position of a closed loop control system. However, because this depends on characteristics of the control target, in general, realization of such an increase is not easy. Therefore, a method may be considered in which the offset error of the detection value of the current sensor is corrected with high precision to reduce the torque ripple, to thereby suppress the position error.

Among driving apparatuses of the related art, there exist apparatuses in which the detection value of the current sensor during a period in which no current is applied to the motor is acquired, and the acquired detection value is used as an offset correction amount. That is, in the state where the motor is not driven, the detection value of the current sensor should be zero, and the driving apparatus uses the value which is detected in this period to correct the offset.

However, for targets having strict margin levels for the position error such as the NC machine tool, in the offset error correction method of the current sensor with the method of the related art, the detected current value may be affected by noise and strain, and the detected value may not be sufficient for use as a correction value for suppressing the torque ripple and the position error.

In consideration of this, in Patent Literature 3, a method is proposed in which a compensator of the current offset is learned by a machine learning which has, as inputs, Fourier coefficients acquired by applying fast Fourier transform to a temperature in the motor driving apparatus, a temperature of the three-phase alternating current motor, voltages of various parts of the motor driving apparatus, an error between a commanded position and an actual position of the rotor, and the above-described position error.

CITATION LIST

Patent Literature
Patent Literature 1: JP 5447810 B
Patent Literature 2: JP 6080687 B
Patent Literature 3: JP 2017-79514 A

SUMMARY

An advantage of the present disclosure lies in suppressing the position error caused by an error included in the detection value of the current sensor. As described above, with the method of correcting the offset using a value of a phase current of the motor during a period in which no current is applied, the actual position error is not evaluated. Therefore, as one method of achieving the reduction of the position error due to the torque ripple, a method may be considered in which a position error is evaluated in some form, and the offset is corrected using the evaluation value.

As one method of achieving this, there exists the use of machine learning as described in Patent Literature 3. In machine learning, a complicated behavior determination can be learned from simple inputs, but in general, a very long period of time is required until the learning converges. In particular, reinforcement learning is slow to converge because there is no teacher data.

Moreover, it is difficult to generalize and use a learning model which is acquired by one type of machine tool for other types of machine tools. Thus, it is necessary that a model is learned in each machine tool. Further, if the learning time is long, a large number of man-hours may be expected for the work to learn the model in each type of machine tool.

In consideration of this, there may be proposed selective use of information unique to the current offset correction problem and employing a method of fast convergence, in order to quickly achieve correction of the current offset while evaluating the actual position error.

Furthermore, while Patent Literature 3 does not explicitly describe a specific method of realization for the motor speed in the leaning, a method may be proposed in which the motor is driven under one or more constant speed conditions. In other words, a method may be proposed which does not require driving the motor under various conditions for correction of the offset error.

An advantage of the present disclosure lies in suppression of the control error caused by the error included in the detection value of the current sensor.

According to one aspect of the present disclosure, there is provided a motor driving apparatus comprising: a current sensor that detects a current supplied to a motor; and a computation device, wherein the computation device is configured to execute: a power spectrum computing process to determine a power spectrum for a position error based on a rotational position of the motor and a position command value; and an offset correction computing process to compute an offset correction amount of the current sensor based on the power spectrum determined by the power spectrum computing process, and the power spectrum computing process includes a process to compute a power spectrum of an electrical angle frequency of the position error when a rotational speed of the motor is a constant speed.

According to another aspect of the present disclosure, the offset correction computing process includes: a process to evaluate the power spectrum determined by the power spectrum computing process; a process to update the offset correction amount of the current sensor by an algorithm based on a gradient method; and a process to compute the offset correction amount of the current sensor, which reduces a value of the power spectrum determined by the power spectrum computing process.

According to another aspect of the present disclosure, there is provided a three-phase alternating current motor driving apparatus comprising: an inverter that supplies a current to a three-phase alternating current motor; a current sensor that measures the current supplied from the inverter to the three-phase alternating current motor; a controller that controls an amount of supply of the current from the inverter to the three-phase alternating current motor; a detector that detects an angle as a rotational position of the three-phase alternating current motor; a computation device that judges that the three-phase alternating current motor is at a constant speed, computes a position error by subtracting a detection angle from an angle command value, fast Fourier transforms the position error, and determines a power spectrum at an electrical angle frequency of the position error; and an offset correction computation unit that evaluates the power spectrum and corrects an offset error of the current sensor using an algorithm based on a gradient method. In this configuration, the torque ripple caused by the offset error of the current sensor of the three-phase alternating current motor driving apparatus and the position error of a control shaft of an NC machine tool are reduced.

According to the present disclosure, a control error caused by a detection error of a current sensor of a motor driving apparatus can be reduced. Further, according to an embodiment of the present disclosure described later, a torque ripple of a motor caused by an error included in a detection value of a current sensor of a motor driving apparatus can be reduced, a position error of an NC machine tool can be suppressed, and reliability and machining precision of the apparatus can be improved.

BRIEF DESCRIPTION OF DRAWINGS

Embodiment(s) of the present disclosure will be described based on the following figures, wherein.

DESCRIPTION OF EMBODIMENTS

A torque ripple caused by an offset error of a current sensor and an evaluation method thereof will be briefly described. As a three-phase alternating current motor (motor), an SPM (Surface Permanent Magnet) motor may be employed.

A parameter $\tau$ represents a motor torque [N·m], a parameter $K_e$ represents a torque constant [N·m/A], and a parameter $i_q$ represents a q-axis current [A]. A generation formula of torque in this case is as follows.

[Equation 1]
$$\tau = K_e \cdot i_q \tag{1}$$

In the SPM motor, the torque does not change even when a current is applied to a d axis, and the SPM motor has a characteristic in that the q-axis current $i_q$ and the torque are in a relationship of proportionality.

When a current of U phase, a current of V phase, and a current of W phase are respectively $i_u$, $i_v$, and $i_w$, and an electrical angle is $\theta_{re}$, the following relationship is true for the q-axis current $i_q$.

[Equation 2]
$$i_q = \sqrt{\frac{2}{3}} \left( i_u \sin\theta_{re} + i_v \cos\left(\theta_{re} - \frac{2\pi}{3}\right) + i_w \cos\left(\theta_{re} + \frac{2\pi}{3}\right) \right) \tag{2}$$

Here, a case is considered in which, of the U phase, the V phase, and the W phase, current sensors are attached only for the U phase and the W phase. When offset errors of the current sensors of the U phase and the V phase are $d_u$ and $d_w$, the currents $i_{u0}$ and $i_{w0}$ detected in the U phase and the W phase are respectively $i_{uo} = i_u - d_u$ and $i_{wo} = i_w - d_w$.

In place of attaching a current sensor for the V phase, an estimated value $i_{vo}$ of the V phase current $i_v$ is determined by the following equation.

[Equation 3]
$$i_{vo} = -i_{uo} - i_{wo} \tag{3}$$

An offset error $d_v$ of the V phase current estimation value is described as follows.

[Equation 4]
$$d_v = -d_u - d_w \tag{4}$$

From Equation (2), the q-axis current $i_q$ is determined as follows.

[Equation 5]
$$i_q = \sqrt{\frac{2}{3}} \left( i_{uo} \sin\theta_{re} + i_{vo} \cos\left(\theta_{re} - \frac{2\pi}{3}\right) + i_{wo} \cos\left(\theta_{re} + \frac{2\pi}{3}\right) \right) + \\ \sqrt{\frac{2}{3}} \left( d_u \sin\theta_{re} + d_v \cos\left(\theta_{re} - \frac{2\pi}{3}\right) + d_w \cos\left(\theta_{re} + \frac{2\pi}{3}\right) \right) \tag{5}$$

A second term on the right side of Equation (5) shows an error component due to the offset of the current sensor.

If a ripple component of the torque caused by the offset error of the current sensor is described as $\tau_{rip}$, due to linearity of $i_q$ as shown in Equation (1), the following equation can be obtained.

[Equation 6]

$$\tau_{rip} = \sqrt{\frac{2}{3}} K_e \left( d_u \sin\theta_{re} + d_v \cos\left(\theta_{re} - \frac{2\pi}{3}\right) + d_w \cos\left(\theta_{re} + \frac{2\pi}{3}\right) \right) \quad (6)$$

Further, using the relationship of Equation (4), Equation (6) can be rewritten in the following form.

[Equation 7]

$$\tau_{rip} = \sqrt{\frac{2}{3}} K_e \begin{bmatrix} d_u \left\{ \sin\theta_{re} - \cos\left(\theta_{re} - \frac{2\pi}{3}\right) \right\} + \\ d_w \left\{ \sin\left(\theta_{re} + \frac{2\pi}{3}\right) - \cos\left(\theta_{re} - \frac{2\pi}{3}\right) \right\} \end{bmatrix} \quad (7)$$

$$= \frac{1}{\sqrt{6}} K_e \left[ d_u \cos\theta_{re} - \left((2 - \sqrt{3})d_u + 2\sqrt{3}\, d_w\right) \sin\theta_{re} \right] \quad (8)$$

From this equation, it can be seen that $\tau_{rip}$ oscillates at an electrical angle frequency.

Therefore, when the offset correction amounts of the currents detected in the U phase and the W phase are respectively a and b, and a power spectrum of the electrical angle frequency of a position error signal at the time of constant speed driving of the three-phase alternating current motor is $P(\theta_{re})$, $P(\theta_{re})$ can be expected to monotonically decrease with decreases of the offset errors $d_u$ and $d_w$. Thus, it is possible to evaluate the torque ripple caused by the offset error of the current sensor by measuring $P(\theta_{re})$ during the constant speed driving.

Based on the above-described study, the problem of reducing the torque ripple by correcting the offset can be replaced with a problem of determining the offset correction amounts a and b which would reduce the power spectrum $P(\theta_{re})$ during the constant speed driving.

If the rotational speed of the three-phase alternating current motor is not a constant speed, the change of $P(\theta_{re})$ due to the offset error would depend on time. Specifically, because the position error due to $\tau_{rip}$ appears in a plurality of frequency components, it becomes difficult to accurately determine the evaluation value, caused by the torque ripple, for the current offset error.

Figure 1:
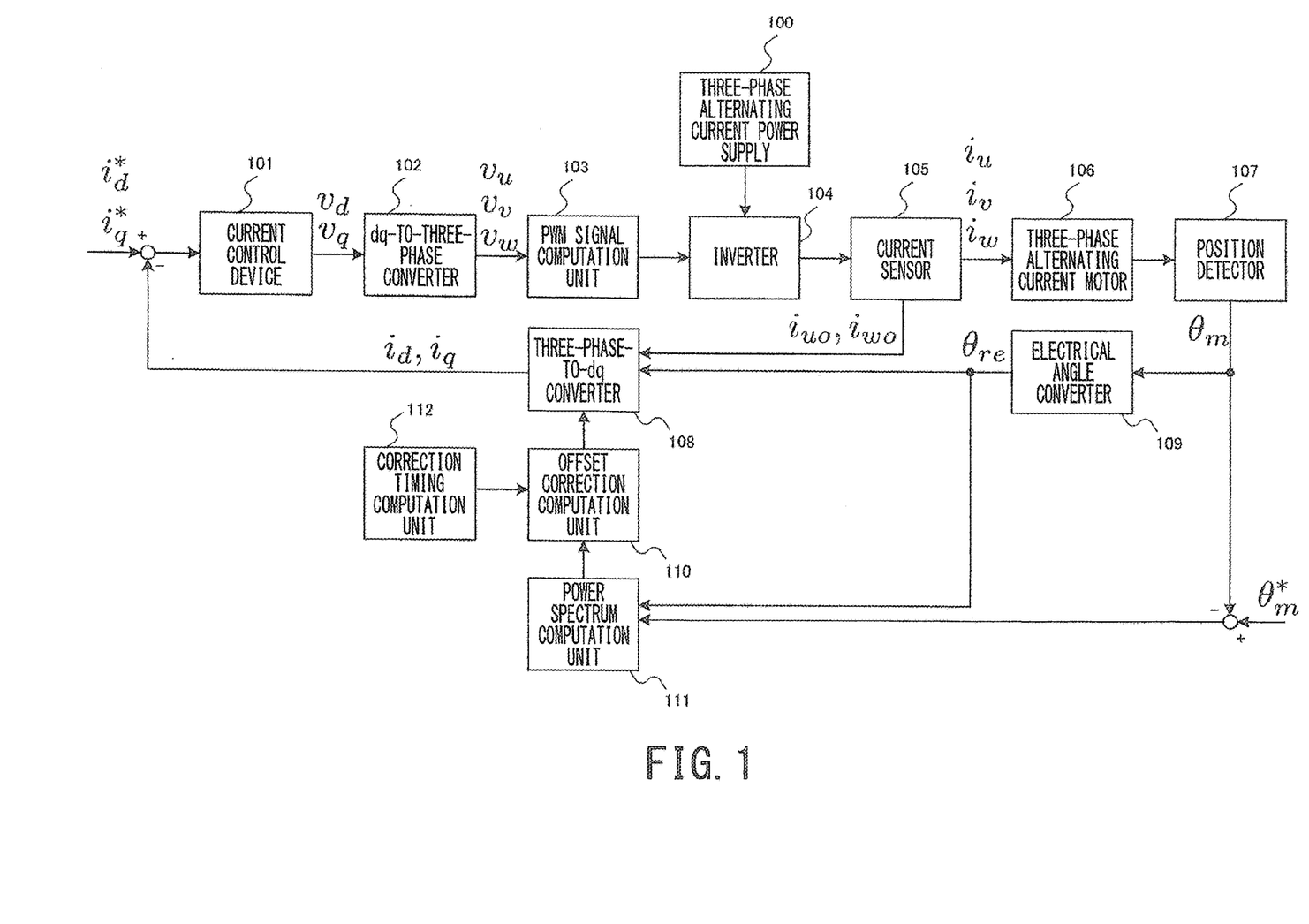
FIG. 1 is a block diagram showing an example configuration of a three-phase alternating current motor driving apparatus according to an embodiment of the present disclosure.

An embodiment of the present disclosure will now be described. FIG. 1 is a block structural diagram for current control of a three-phase alternating current motor driving apparatus to which the present disclosure is applied.

Of the constituting elements shown in FIG. 1, a three-phase alternating current motor driving apparatus according to the present embodiment comprises a current control device 101, a dq-to-three-phase converter 102, a PWM signal computation unit 103, an inverter 104, a current sensor 105, a three-phase-to-dq converter 108, an electrical angle converter 109, an offset compensation computation unit 110, a power spectrum computation unit 111, and a correction timing computation unit 112. A three-phase alternating current power supply 100 is connected from the outside to the inverter 104, for supplying electric power (three-phase alternating current electric power) to a three-phase alternating current motor 106. To the three-phase alternating current motor driving apparatus, a d-axis current command value $i_d^*$, a q-axis current command value $i_q^*$, and a command angle $\theta_m^*$ (position command value) are input from a control device (not shown). Of the constituent elements of the three-phase alternating current motor driving apparatus, any or all of the current control device 101, the dq-to-three-phase converter 102, the PWM signal computation unit 103, the three-phase-to-dq converter 108, the electrical angle converter 109, the offset correction computation unit 110, the power spectrum computation unit 111, and the correction timing computation unit 112 may be formed by a computation device such as a processor. In this case, the computation device may be configured to execute a process assigned to each constituting element by executing a program. Further, each of or a combination of any of the current control device 101, the dq-to-three-phase converter 102, the PWM signal computation unit 103, the three-phase-to-dq converter 108, the electrical angle converter 109, the offset correction computation unit 110, the power spectrum computation unit 111, and the correction timing computation unit 112 may be individually formed by a computation device. In this case, each computation device is configured to execute a process assigned to each constituent element by executing a program.

The three-phase alternating current motor driving apparatus is connected to a position detector 107, receives an electrical signal from the position detector 107, and detects an angle $\theta_m$ as a rotational position of the three-phase alternating current motor. A control current is computed according to the detected angle $\theta_m$ and an angular speed $\omega_m$ (not shown) obtained by time-differentiating the angle $\theta_m$, and the control current is supplied through the inverter 104 to the three-phase alternating current motor 106. The three-phase alternating current motor 106 may be a synchronous motor having a rotor with a permanent magnet. For the rotor, a two-phase rotation (d and q axes) coordinate system is defined.

The current control device 101 computes a d-axis voltage command value $v_d$ and a q-axis voltage command value $v_q$ using a PI control and based on the d-axis current command value $i_d^*$ and the q-axis current command value $i_q^*$ which are input, and a difference between the d-axis current value $i_d$ and the q-axis current value $i_q$ converted by the three-phase-to-dq converter 108, and outputs the voltage command values to the dq-to-three-phase converter 102.

The dq-to-three-phase converter 102 computes voltage command values $v_u$, $v_v$, and $v_w$ for the U phase, the V phase, and the W phase based on the d-axis voltage command value $v_d$ and the q-axis voltage command value $v_q$ which are input, and the electrical angle $\theta_{re}$ of a rotor of the three-phase alternating current motor 106 detected by the position detector 107, and outputs the voltage command values to the PWM signal computation unit 103.

The PWM signal computation unit 103 computes a duty ratio corresponding to the U-phase voltage command value $v_u$, the V-phase voltage command value $v_v$, and the W-phase voltage command value $v_w$, and outputs a pulse signal of the computed duty ratio to the inverter 104.

In the inverter 104, a ratio of ON times of a bridge upper semiconductor and a bridge lower semiconductor is controlled by the pulse signal, so as to apply alternating current voltages equal to the U-phase voltage command value $v_u$, the V-phase voltage command value $v_v$, and the W-phase voltage command value $v_w$ to three-phase windings (not shown) of the three-phase alternating current motor 106.

The current sensor 105 outputs detection values $i_{uo}$ and $i_{wo}$ of the U-phase current and the W-phase current, respectively, of the three-phase alternating current motor 106. The estimation value $i_{vo}$ of the V-phase current is computed as $i_{vo} = -i_{uo} - i_{wo}$. The electrical angle $\theta_{re}$ is computed by multiplying the rotational angle $\theta_m$ by a number of pole pairs using the electrical angle converter 109. The three-phaseto-dq converter 108 computes and outputs the d-axis current $i_d$ and the q-axis current $i_q$ by coordinate conversion, based on the electrical angle $\theta_{re}$, the U-phase current $i_{uo}$, and the W-phase current $i_{wo}$.

The power spectrum computation unit 111 receives, as inputs, the electrical angle $\theta_{re}$ and a position error obtained by subtracting the angle $\theta_m$ from the commanded angle $\theta_m*$ (position command value), and computes and outputs a power spectrum $P(\theta_{re})$ of a position error signal at the electrical angle frequency by fast Fourier transform.

The correction timing computation unit 112 judges a timing of correction based on the motor speed, a number of samplings necessary for the Fourier transform, or the like, and notifies the timing to the offset correction computation unit 110.

The offset correction computation unit 110 receives, as inputs, the power spectrum $P(\theta_{re})$, and detection values and $i_{uo}$ and $i_{wo}$ the estimation value $i_{vo}$ of the phase currents, evaluates the power spectrum $P(\theta_{re})$, and outputs an offset correction amount of the current sensor 105. An embodiment of the offset correction computation will now be described.

Figure 2:
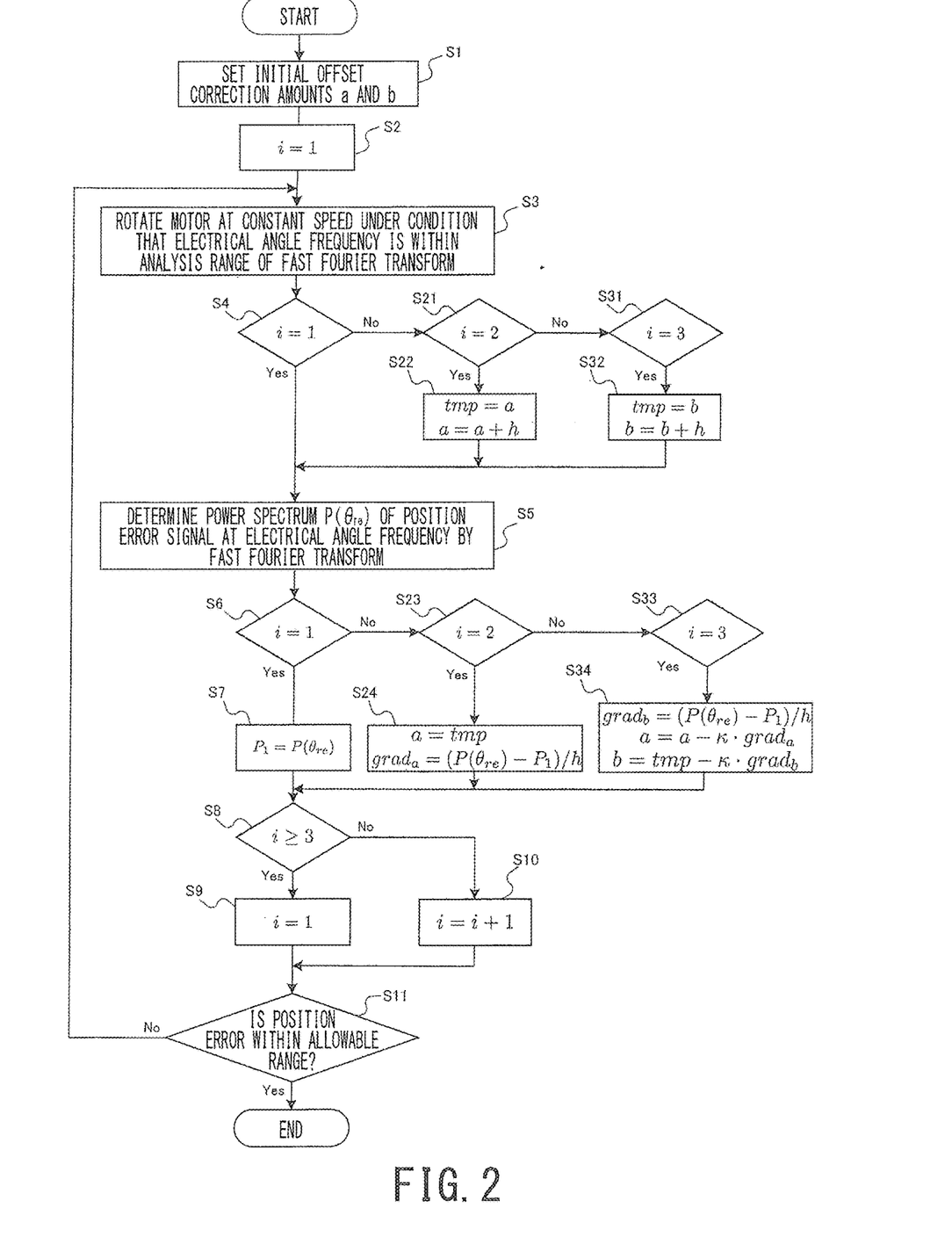
FIG. 2 is a flowchart of an updating algorithm of an offset correction amount of a current sensor in an embodiment of the present disclosure.

FIG. 2 is a flowchart explaining an algorithm in the embodiment of the present disclosure. In this algorithm, the offset correction amount is computed. First, a counter i is initialized to 1, and initial values are set for the offset correction amounts a and b. Then, the three-phase alternating current motor is operated at a constant speed. In this process, the electrical angle frequency is set so that the frequency is within an analysis range of fast Fourier transform. The concept of "constant speed" in the present specification includes a slight variation of the rotational speed of the three-phase alternating current motor to a degree sufficient to correct the offset error of the detection value of the current sensor 105. In other words, the constant speed in the present specification includes a case where the variation of the rotational speed of the three-phase alternating current motor is within a predetermined allowable range.

Next, the power spectrum is reduced by an algorithm similar to a gradient method. A reference sign tmp in FIG. 2 indicates a variable for temporarily holding the offset correction amount. In addition, a reference sign h indicates a difference for determining a numerical value gradient, and a reference sign κ indicates a learning coefficient used in updating the offset correction amount.

According to the value of the counter, i=1, 2, and 3, numerical value gradients $grad_a$ and $grad_b$ for the offset correction amounts a and b are sequentially computed. Then, based on updating rules, $a(n+1)=a(n)-\kappa \cdot grad_a$ and $b(n+1)=b(n)-\kappa \cdot grad_b$, of the gradient method, the offset correction amounts a and b are updated. A reference sign n (not shown) indicates a number of updates of the offset correction amounts a and b. When the counter i reaches the count of 3, the counter i is initialized to 1.

The flowchart of FIG. 2 will now be described in detail. The offset correction computation unit 110 sets the initial offset correction amounts a and b (S1), and sets the value of the counter to i=1 (S2). The alternating current motor driving apparatus and a control apparatus which controls the alternating current motor driving apparatus causes the three-phase alternating current motor 106 to rotate at a constant speed (S3). The rotational speed is set under a condition that the electrical angle frequency is within a predetermined analysis section in the frequency domain (domain after fast Fourier transform).

The offset correction computation unit 110 executes a process corresponding to the value i of the counter (S4, S21, S31). Specifically, the offset correction computation unit 110 executes step S5 when i=1, executes step S22 and then step S5 when i=2, and executes step S32 and then step S5 when i=3.

When i=1, the offset correction computation unit 110 determines the power spectrum $P(\theta_{re})$ under a condition that the offset correction amounts a and b are initial values (S5). This process is executed by applying fast Fourier transform to the position error signal and determining a value of the spectrum at the electrical angle frequency.

When i=2, the offset correction computation unit 110 stores the value of the offset correction amount a in the variable tmp, and increases the offset correction amount a by the difference h (S22). In addition, when i=3, the offset correction computation unit 110 stores the value of the offset correction amount b in the variable tmp, and increases the offset correction amount b by the difference h (S32). The offset correction computation unit 110 determines the power spectrum $P(\theta_{re})$ based on the offset correction amounts a and b which are set in step S22 or S32 (S5).

When i=1, the offset correction computation unit 110 sets the power spectrum $P(\theta_{re})$, determined under the condition that the offset correction amounts a and b are initial values, as $P_1$ (S6, S7). When i=2, the offset correction computation unit 110 sets the value of the offset correction amount a to the value stored in the variable tmp in step S22 (S23, S24). In addition, a numerical value gradient $grad_a$ of the offset correction amount a is determined based on an equation of $grad_a=(P(\theta_{re})-P_1)/h$ (S24). When i=3, the offset correction computation unit 110 determines a numerical value gradient $grad_b$ of the offset correction amount b based on an equation of $grad_b=(P(\theta_{re})-P_1)/h$ (S33, S34). In addition, the offset correction amount a is updated based on a formula of $a=a-\kappa \cdot grad_a$ (S34). Further, the offset correction amount b is updated based on a formula of $b=tmp-\kappa \cdot grad_b$ (S34).

The offset correction computation unit 110 judges whether or not the value i of the counter is 3 or greater (S8), and, when the value i of the counter is 3 or greater, i is set to 1, and the process proceeds to a process of step S11 (S9). On the other hand, when the value i of the counter is 1 or 2, the offset correction computation unit 110 increments the value i of the counter by 1, and the process proceeds to the process of step S11 (S10). The offset correction computation unit 110 judges whether or not the position error is within an allowable range, that is, whether or not an absolute value of the position error is less than or equal to an allowable value (S11). When the position error is within the allowable range, the offset correction computation unit 110 completes the process, and, when the position error is outside of the allowable range, the process returns to the process of step S3.

Figure 3:
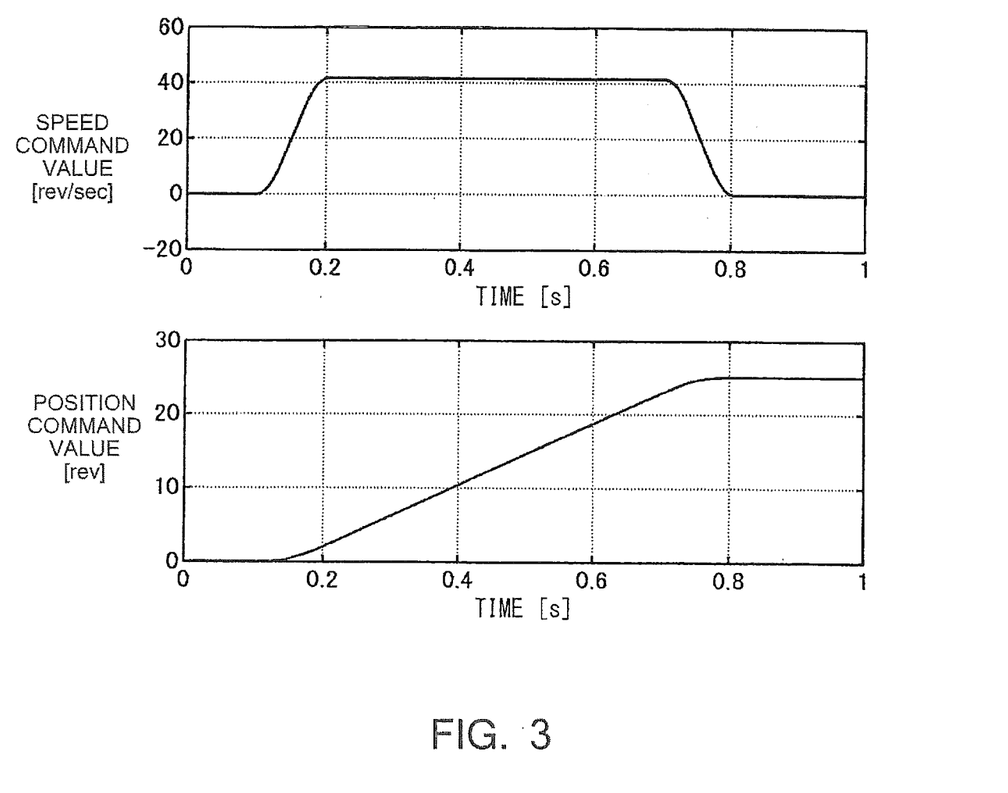
FIG. 3 is a graph showing examples of a speed command value and a position command value of a driving apparatus in an embodiment of the present disclosure.
Figure 4:
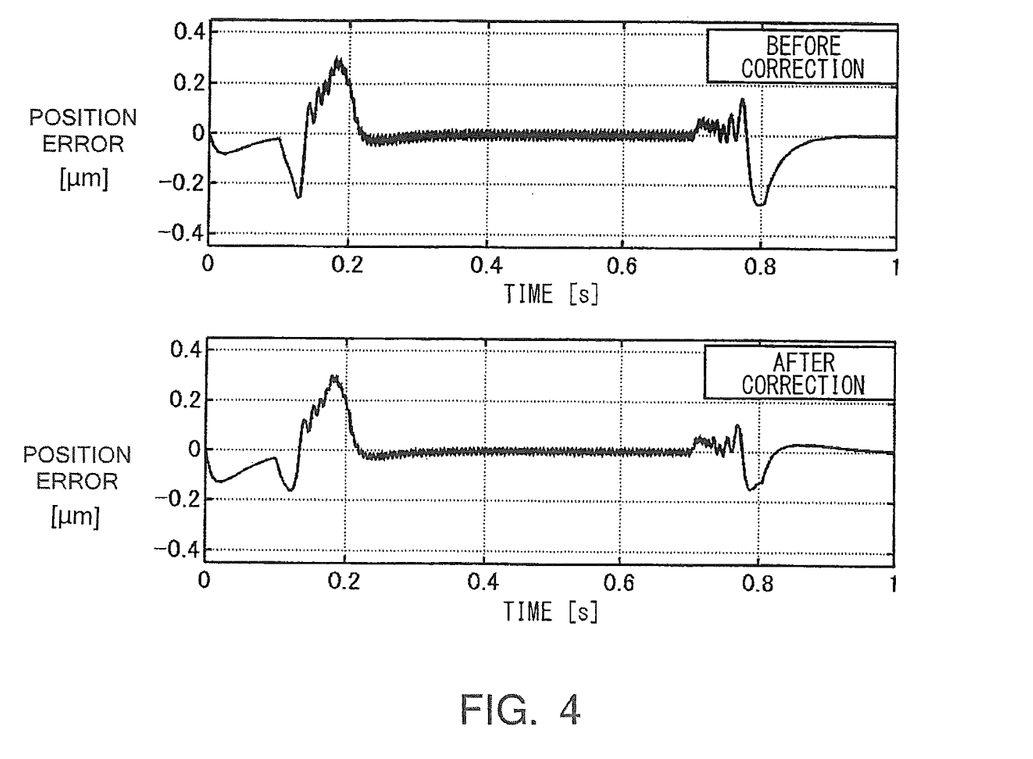
FIG. 4 is a graph showing an example of motor position errors before and after offset correction in a simulation of an embodiment of the present disclosure.
Figure 5:
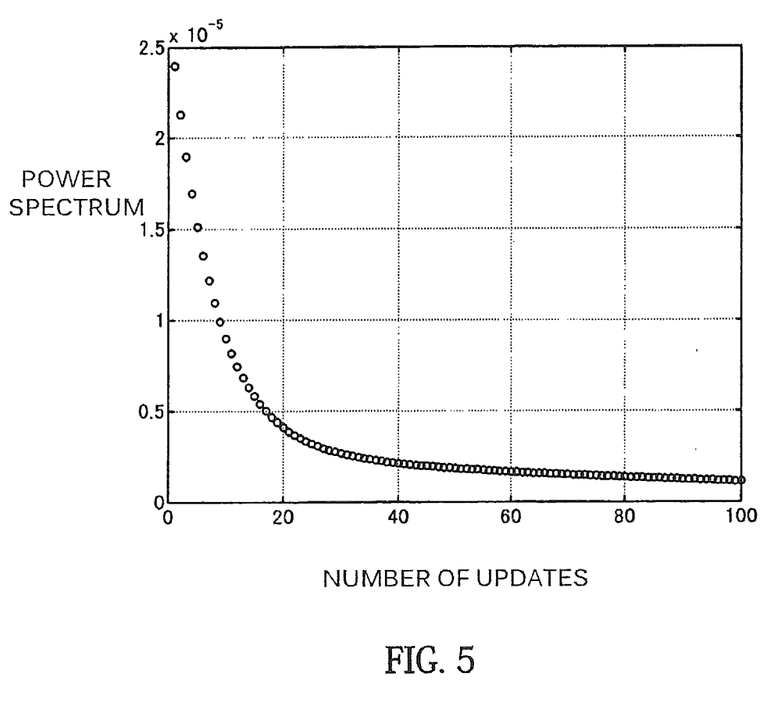
FIG. 5 is a graph showing a transition of a power spectrum in a simulation of an embodiment of the present disclosure.

FIG. 3, FIG. 4, and FIG. 5 show simulation results when 300 rpm is supplied as a speed command value to a three-phase alternating current motor having a number of pole pairs of 4. The electrical angle frequency in this case is 20 Hz. FIG. 3 shows the speed command value and the position command value. FIG. 4 shows a graph of a position error before and after the correction by the algorithm of the present embodiment. FIG. 5 shows a transition of the power spectrum $P(\theta_{re})$ at the electrical angle frequency when the algorithm of the present embodiment is used. Here, the initial values of the offset correction amounts a and b are both set to 0.

As shown in FIG. 4, the position error is reduced after the correction, and the advantage of the algorithm of the present embodiment can be seen. As shown in FIG. 5, the power spectrum $P(\theta_{re})$ at the electrical angle frequency is reduced by the algorithm of the present embodiment.

Further, as shown in FIG. 5, the power spectrum $P(\theta_{re})$ serving as an evaluation value is approximately converged at the 40th update of the offset correction amount, which proves that the convergence is fast by a numerical value experiment.

If the correction amount is to be updated once every 8 ms when the rotational speed of the three-phase alternating current motor is a constant speed, the value sufficiently converges when the constant speed section is 320 ms. Thus, according to the present method, the current offset is corrected in a simple manner without an in-advance adjustment or learning in each machine tool.

In the above-described embodiment, an algorithm similar to the steepest descent among the gradient method is used. Alternatively, the section method or other gradient methods may be used from the viewpoint of quickly reducing the power spectrum.

The invention claimed is:

1. A motor driving apparatus comprising:
   a current sensor that detects a current supplied to a motor; and
   a computation device, wherein
   the computation device is configured to execute:
   a power spectrum computing process to determine a power spectrum based on an electrical angle and a position error indicative of a difference between a position command value and a rotational angle;
   an offset correction computing process to compute an offset correction amount of the current sensor based on the power spectrum determined by the power spectrum computing process,
   an offset timing process to compute a timing of the offset correction and inputs the timing into the offset correction computing process; and
   the power spectrum computing process includes a process to compute a power spectrum indicative of an electrical angle frequency component of the position error when a rotational speed of the motor is a constant speed.

2. The motor driving apparatus according to claim 1, wherein
   the offset correction computing process includes:
   a process to evaluate the power spectrum determined by the power spectrum computing process;
   a process to update an offset correction amount of the current sensor by an algorithm based on a gradient method; and
   a process to compute the offset correction amount of the current sensor, which reduces a value of the power spectrum determined by the power spectrum computing process.

* * * * *